(12) United States Patent
Asami et al.

(10) Patent No.: US 6,850,406 B2
(45) Date of Patent: Feb. 1, 2005

(54) NB SOLID ELECTROLYTIC CAPACITOR AND METHOD FOR PREPARING THE SAME

(75) Inventors: Tadamasa Asami, Miyagi (JP); Katsuhiro Yoshida, Miyagi (JP); Kunihiko Shimizu, Miyagi (JP); Takashi Kono, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 135 days.

(21) Appl. No.: 10/345,223

(22) Filed: Jan. 16, 2003

(65) Prior Publication Data

US 2003/0142465 A1 Jul. 31, 2003

(30) Foreign Application Priority Data

Jan. 18, 2002 (JP) ......................................... 2002-010810

(51) Int. Cl.⁷ .............................................. H01G 9/042
(52) U.S. Cl. ......................... 361/528; 361/529; 75/229; 75/252
(58) Field of Search ................................ 361/523, 528, 361/529, 516; 29/25.03

(56) References Cited

U.S. PATENT DOCUMENTS 5,036,424 A * 7/1991 Yokotani et al. .......... 361/321.4
5,448,447 A   9/1995 Chang
6,051,044 A   4/2000 Fife
6,373,685 B1 * 4/2002 Kimmel et al. ............. 361/508

FOREIGN PATENT DOCUMENTS

| JP | 11-150041 A | 6/1999 |
|----|-------------|--------|
| JP | 2000-216061 A | 8/2000 |
| JP | 3196832 B | 6/2001 |
| JP | 2001-160318 A | 6/2001 |

* cited by examiner

*Primary Examiner*—Anthony Dinkins
(74) *Attorney, Agent, or Firm*—Sughrue Mion, PLLC

(57) ABSTRACT

An Nb solid electrolytic capacitor is disclosed which comprises: an anode body made from an Nb-based material, the anode body having a nitrogen content of about 7,500 ppm to about 47,000 ppm; a dielectric layer formed over the surface of the anode body; a solid electrolyte layer formed on the dielectric layer; and a cathode body formed on the surface of the solid electrolyte layer. The Nb solid electrolytic capacitor shows small bias dependence. A method for preparing the same is also disclosed which comprises steps of: forming an anode body from an Nb-based material, the anode body having a nitrogen content of about 7,500 ppm to about 47,000 ppm; forming a dielectric layer over the surface of the anode body; forming a solid electrolyte layer on the dielectric layer; and forming a cathode body on the electrolyte layer.

22 Claims, 10 Drawing Sheets

NB SOLID ELECTROLYTIC CAPACITOR AND METHOD FOR PREPARING THE SAME

BACKGROUND OF THE INVENTION

1. Field of the Invention

The present invention relates to an Nb solid electrolytic capacitor and a method for preparing the same.

2. Description of the Prior Art

Heretofore, a solid electrolytic capacitor has comprised an anode, a dielectric, an electrolyte layer, and a cathode. Generally, a solid electrolytic capacitor has had a structure comprising an anode made of a metal exhibiting valve action (valve metal), an oxidized layer as a dielectric layer formed over the surface of the anode, a solid electrolyte layer as a semiconductor layer formed on the dielectric layer, and a cathode made of graphite or the like formed on the solid electrolyte layer.

In this connection, the valve metal means a metal capable of forming an oxidized layer whose thickness can be controlled by anodic oxidation. Specifically, valve metal includes niobium (Nb), aluminum (Al), tantalum (Ta), titanium (Ti), hafnium (Hf) and zirconiun (Zr). Actually, however, aluminum and tantalum are mainly used.

With respect to Al, a foil is generally used as the anode, and with respect to Ta, a porous body prepared by sintering a Ta-based powder is used as the anode.

Of those solid electrolytic capacitors, a solid electrolytic capacitor of a porous sintered body type is particularly adaptable to miniaturization and capable of being adapted to have a high capacity, and hence there is strong demand therefor as a part which meets needs of miniaturization of a cellular phone, information terminal equipment or the like.

Recently, however, use of Ta solid electrolytic capacitors has not been expanded. This is because the annual output of Ta, which has been used for forming an anode and a dielectric of a Ta solid electrolytic capacitor, has been small owing to the fact that the amount of deposits of Ta is estimated to be small, and in consequence, the price of Ta has become increasing high. It is hardly expected that the price of Ta will decline hereafter. Accordingly, an alternative to Ta has been sought as a material for a solid electrolytic capacitor.

As the alternative, Nb which exhibits performance comparable to that of Ta when used in a solid electrolytic capacitor is considered to be a highly potential material. The amount of Nb deposits is estimated to be 100 times that of Ta deposits or more, and Nb is thus inexpensive as compared with Ta. Further, since Nb is distributed and outputted in various parts of the world, Nb is expected to be stably available.

Moreover, Nb has a specific gravity as low as about a half of that of Ta, and this enables further weight reduction of a solid electrolytic capacitor to be realized. Accordingly, it is expected that an Nb solid electrolytic capacitor will be mainstream from now on.

In the following, a typical preparation method of a conventional Nb solid electrolytic capacitor will be described with reference to FIG. 10.

(1) Formation of Nb Porous Body (a) Preparation of Nb-based Powder (S 91)

To improve press-moldability, a binder is added to an Nb powder, and the addition is followed by mixing.

(b) Press Molding (S 92) and Sintering (S 93)

An element lead wire for an anode is partially inserted in the Nb-based mixed powder, and the resultant is press-molded into an appropriate shape, for example, a prism shape.

Then, the press-molded product is sintered by heating at a temperature of 1,000° C. to 1,400° C. under high vacuum ($10^{-4}$ Pa or higher vacuum) to form an Nb porous body as an anode body, and the Nb porous body is allowed to cool under vacuum.

(2) Formation of Dielectric Layer [Chemical Conversion Treatment (S 94)]

The Nb porous body as an anode is soaked in an electrolytic aqueous solution such as a phosphoric acid aqueous solution together with a counter electrode, and a chemical conversion voltage (formation voltage) is applied to thereby form an oxidized Nb layer as a dielectric layer over the surface of the Nb porous body. (anodic oxidation method)

The thickness of the dielectric layer is dependent upon the condition of the chemical conversion voltage (Vf: formation voltage), and characteristics of a capacitor are in turn dependent upon the thickness of the oxidized Nb layer. As the electrolytic solution, there may be used an aqueous solution of phosphoric acid of which concentration is 0.01 to 10 vol. %, or the like.

(3) Formation of Electrolyte Layer (S 95)

On the oxidized layer formed over the Nb porous body in the preceding step, a solid electrolyte layer is formed.

As the solid electrolyte, there may be used manganese dioxide, or an electrically conductive polymer obtained by polymerizing a monomeric material such as pyrrole, thiophene or a derivative thereof.

For example, when a pyrrole polymer is used as the solid electrolyte, a solid electrolyte layer is formed on the dielectric layer formed over the surface of the anode body by effecting chemical polymerization or electrolytic polymerization using a pyrrole monomer solution and a solution of an oxidizing agent such as iron trichloride, as disclosed in Japanese Unexamined Patent Publication No.2001-160318 by Fukunaga et al.

For forming the electrically conductive polymer, a process may be employed which comprises preliminarily applying an oxidizing agent to the surface of the dielectric layer, and then soaking the resultant in a monomer solution to effect polymerization reaction, as disclosed in Japanese Unexamined Patent Publication No.2000-216061 by Takada et al.

When manganese is used as the solid electrolyte, the anode body with the dielectric layer formed over the surface thereof is sequentially subjected to soaking in manganese nitrate or the like and heat-treatment or the like to thereby form a solid electrolyte layer.

(4) Formation of Graphite Paste Layer (S 96), Formation of Silver(Ag)-Containing Paste Layer (S 97), Connection of Lead Frames (S 98), and Sheathing by Molding (S 99)

A graphite layer as a cathode layer is formed on the solid electrolyte layer which has been formed in S 95. For the formation of the graphite layer, there may be used a method disclosed in Japanese Unexamined Patent Publication No.1999-297574 by Nakazawa et al.

A silver(Ag)-containing paste layer is formed on the graphite layer.

Then, a lead frame for the anode is connected to the element lead wire of the anode body by spot welding, and a lead frame for the cathode is connected to the silver(Ag)-containing paste layer with a silver-containing electrically conductive adhesive.

Finally, the resulting capacitor element is sheathed with a resin by molding with end portions of the lead frames out to complete an Nb solid electrolytic capacitor.

However, the Nb solid electrolytic capacitor prepared through the above-described steps has bias dependence incapacity. The term "bias dependence in capacity" used herein means dependence of an Nb solid electrolytic capacitor in electric capacity upon bias voltage applied to the Nb solid electrolytic capacitor.

As an example, characteristics of the Nb solid electrolytic capacitor prepared by the above-described conventional technique are shown below. The capacity of this capacitor when bias voltage is 0V at 120 Hz, which is expressed as C[120 Hz·0V], is 365 $\mu$F. On the other hand, the capacity of the capacitor when bias voltage is 1.5V at 120 Hz, i.e., C[120 Hz·1.5V] is 310 $\mu$F.

Such a variation is generally described in the form of a rate of bias-dependent variation R.

$$R=(C[120\ Hz\cdot 0V]-C[120\ Hz\cdot 1.5V])/C[120\ Hz\cdot 1.5V]\times 100\ (\%)$$

Such a variation in capacity of an Nb solid electrolytic capacitor possesses possibility that an electrical circuit comprising the capacitor will not operate as designed. Accordingly, it is difficult to use an Nb solid electrolytic capacitor of this type in various appliances, in particular, in precision appliances which requires the capacitor to have small variation in capacity rather than to have large capacity.

Under the circumstances, an Nb solid electrolytic capacitor has been provided which comprises a metallic Nb sintered body as an anode and an oxidized Nb layer including Nb nitride areas as a dielectric layer, as disclosed in JP3196832 by one of the present inventors et al.

However, even with the Nb solid electrolytic capacitor having such a structure, a rate of bias-dependent variation is at best about ±20%. Accordingly, it is difficult to apply the capacitor to a circuit for a precision appliance.

Further, in U.S. Pat. No. 6,051,044 disclosed by Fife, an Nb solid electrolytic capacitor has been provided which is prepared using a niobium powder having a predetermined nitrogen content and a predetermined BET surface area.

However, in the Patent, discussion is made on leakage current but no discussion is made at all on a rate of bias-dependent variation.

SUMMARY OF THE INVENTION

It is an object of the present invention to provide an Nb solid electrolytic capacitor which is lower in a rate of bias-dependent variation, in other words, in bias dependence than conventional Nb solid electrolytic capacitors, and a method for preparing the same.

The present inventors have taken note of the fact that (metallic) Nb is highly susceptible to oxidation with oxygen in air to form Nb oxides, in particular, Nb suboxides: $Nb_2O_{5-x}$ wherein x is a positive number smaller than 5, which are also referred to as non-stoichiometric Nb oxides and the fact that the non-stoichiometric Nb oxides behave as an n-type semiconductor. Based on the facts, they have supposed that the formation of the non-stoichiometric oxides in the vicinity of the interface between the Nb-based anode body and the dielectric layer is the cause of occurrence of bias dependence.

On the basis of the supposition, the present invention has been made to provide an Nb solid electrolytic capacitor which is less susceptible to formation of such non-stoichiometric Nb oxides in the vicinity of the interface, and a method for preparing an Nb solid electrolytic capacitor in such a manner that the non-stoichiometric Nb oxides are less likely to form in the vicinity of the interface.

Further, the present invention provides a method for preparing an Nb solid electrolytic capacitor which comprises a step of removing the non-stoichiometric Nb oxides unavoidably formed in the conventional anodic oxidation for forming a dielectric layer containing Nb oxides, and an Nb solid electrolytic capacitor obtained by the preparation method.

By the experiments carried out in accordance with the present invention, the present invention was confirmed to be extremely effective.

According to an embodiment of the present invention, there is provided an Nb solid electrolytic capacitor comprising an anode body made from an Nb-based material, said anode body having a nitrogen content of about 7,500 ppm to about 47,000 ppm, a dielectric layer formed over the surface of the anode body, a solid electrolyte layer formed on the dielectric layer and a cathode body formed on the surface of the solid electrolyte layer.

By virtue of the fact that the anode body has a nitrogen content in the above-mentioned range, the nitrogen suppresses formation of non-stoichiometric Nb oxides in the vicinity of the interface between the anode body and the dielectric.

Since such non-stoichiometric Nb oxides behave as an n-type semiconductor, an Nb solid electrolytic capacitor containing non-stoichiometric Nb oxides in the vicinity of an interface between an anode body and a dielectric layer in an amount exceeding an acceptable level has bias dependence in capacity due to the influence of voltage dependence of the non-stoichiometric Nb oxides. Accordingly, an Nb solid electrolytic capacitor which is less susceptible to formation of non-stoichiometric Nb oxides in the vicinity of an interface between an anode body and a dielectric layer in a suppressed amount is less likely to have bias dependence.

According to another embodiment of the present invention, there is provided a method for preparing an Nb solid electrolytic capacitor, said method comprising steps of:

(A) forming an anode body from an Nb-based material, said anode body having a nitrogen content of about 7,500 ppm to about 47,000 ppm;

(B) forming a dielectric layer over the surface of the anode body;

(C) forming a solid electrolyte layer on the dielectric layer; and (D) forming a cathode body on the electrolyte layer.

By employing the method, formation of non-stoichiometric Nb oxides in the vicinity of the interface between the anode body and the dielectric layer is suppressed. An Nb solid electrolytic capacitor prepared in such a manner that no substantial non-stoichiometric Nb oxides are formed has no substantial bias dependence, as described above.

According to still another embodiment of the present invention, there is provided a method for preparing an Nb solid electrolytic capacitor, said method comprising steps of:

(H) forming a dielectric layer by anodic oxidation method over the surface of an anode body made from an Nb-based material;

(I) heating the anode body provided with the dielectric layer at a temperature of about 100° C. to about 300° C.;

(J) re-subjecting the product resulting from the step (I) to anodic oxidation;

(K) forming a solid electrolyte layer on the dielectric layer; and (L) forming a cathode body on the solid electrolyte layer.

By employing the method, non-stoichiometric Nb oxides formed in the dielectric layer during the anodic oxidation treatment are effectively removed. Accordingly, an Nb solid electrolytic capacitor prepared by the method is less likely to have bias dependence.

According to a further embodiment of the present invention, there is provided an Nb solid electrolytic capacitor comprising:

a dielectric layer formed by anodic oxidation method over the surface of the anode body made from an Nb-based material, said anode body (provided) with the dielectric layer being heated at a temperature of about 100° C. to about 300° C. and then being re-subjected to anodic oxidation;

a solid electrolyte layer formed on the dielectric layer; and a cathode body formed on the solid electrolyte layer.

In the Nb solid electrolytic capacitor, non-stoichiometric Nb oxides formed in the dielectric layer during the anodic oxidation treatment are effectively removed. Accordingly, the Nb solid electrolytic capacitor is less likely to have bias dependence.

BRIEF DESCRIPTION OF THE DRAWINGS

The above-mentioned objects and other objects, embodiments and effects of the present invention will be more apparent by the following description with reference to the drawings.

DETAILED DESCRIPTION OF THE PREFERRED EMBODIMENTS

In the following, the first embodiment of the Nb solid electrolytic capacitor according to the present invention and the first embodiment of the method for preparing the same will be described with reference to the drawings.

First, description will be given on the Nb solid electrolytic capacitor according to the present invention with reference to FIG. 1.

Figure 1:
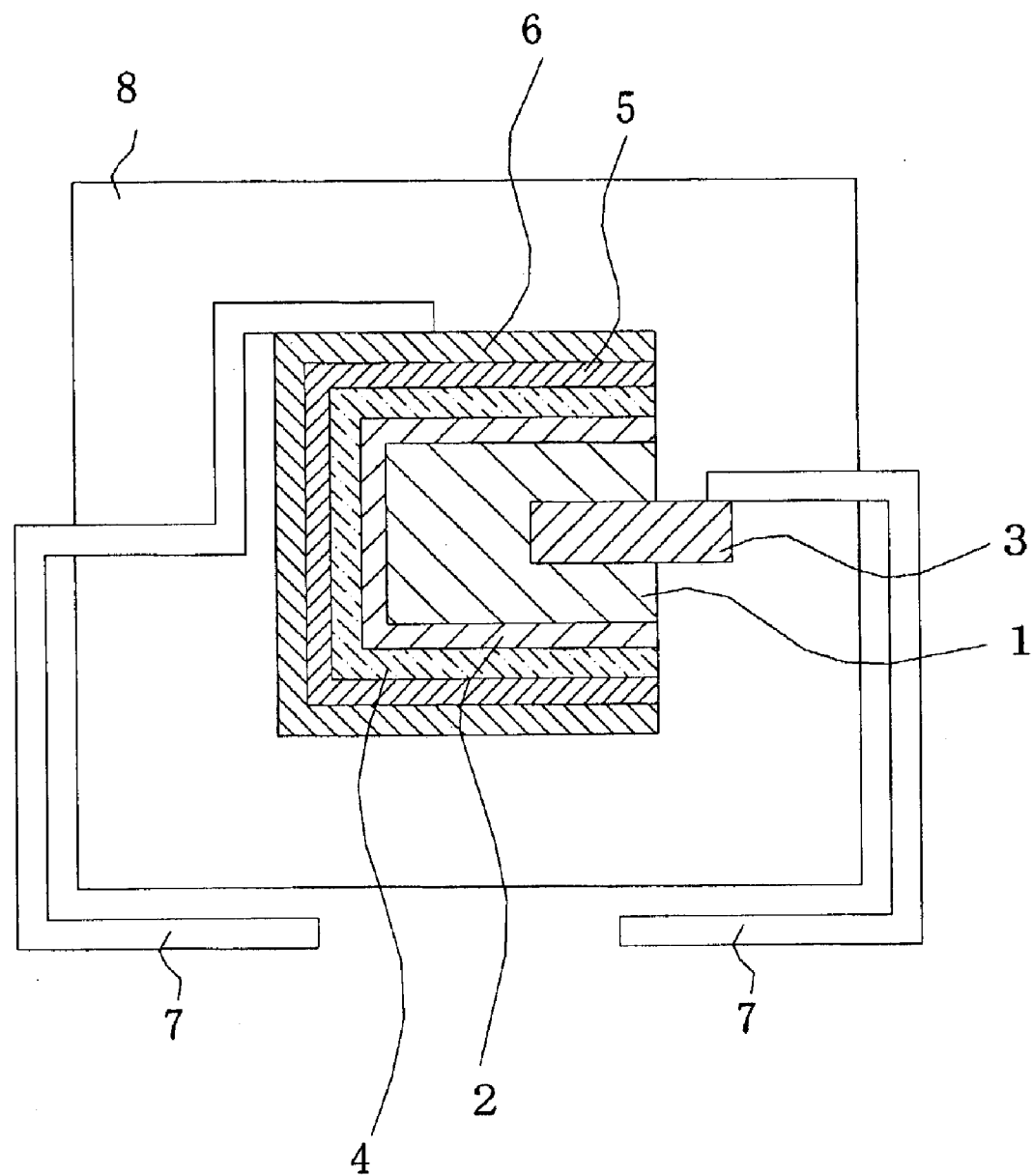
FIG. 1 is a sectional view schematically showing a constitution of the first embodiment of the Nb solid electrolytic capacitor according to the present invention.

As shown in FIG. 1, the first embodiment of the Nb solid electrolytic capacitor according to the present invention comprises a capacitor element, lead frames 7 to which an anode section and a cathode section of the capacitor element are directly and indirectly connected, respectively, and a molded resin 8 which seals at least the capacitor element.

The capacitor element as a constituent of the Nb solid electrolytic capacitor comprises an element lead wire 3 made of Nb-based material, an anode body 1 with the element lead wire 3 and implanted therein which anode body is prepared by sintering an Nb-based mixed powder, a dielectric layer 2 formed over the surface of the anode body 1, a solid electrolyte layer 4 formed on the surface of the dielectric layer 2 and including an electrically conductive polymer, a cathode body 5 consisting of a graphite paste layer formed on the solid electrolyte layer 4, and a silver (Ag)-containing paste layer 6 formed on the cathode body 5.

The above-mentioned anode section means the element lead wire 3 which has been inserted in the anode body 1 when the anode body has been formed. Over the surface of the element lead wire 3, the dielectric layer 2 is not formed so as to permit electric conduction between the element lead wire and the lead frame 7 to which the element lead wire is connected.

The above-mentioned cathode section means the outermost layer to which the lead frame 7 is connected and which is in conduction with the cathode body 5 of the capacitor element. In this embodiment, the silver(Ag)-containing paste layer 6 corresponds to the cathode section.

In other words, the lead frames 7 are an anode terminal and a cathode terminal which are connected to the element lead wire 3 as the anode section and the silver(Ag)-containing paste layer 6 as the cathode section, respectively.

In this embodiment, the lead frame 7 as the cathode terminal and the silver(Ag)-containing paste layer 6 are connected via an electrically conductive adhesive.

Subsequently, the structure of the embodiment of the Nb solid electrolytic capacitor according to the present invention and, in particular, the structure of the above-described capacitor element will be described below with reference to FIG. 2.

Figure 2:
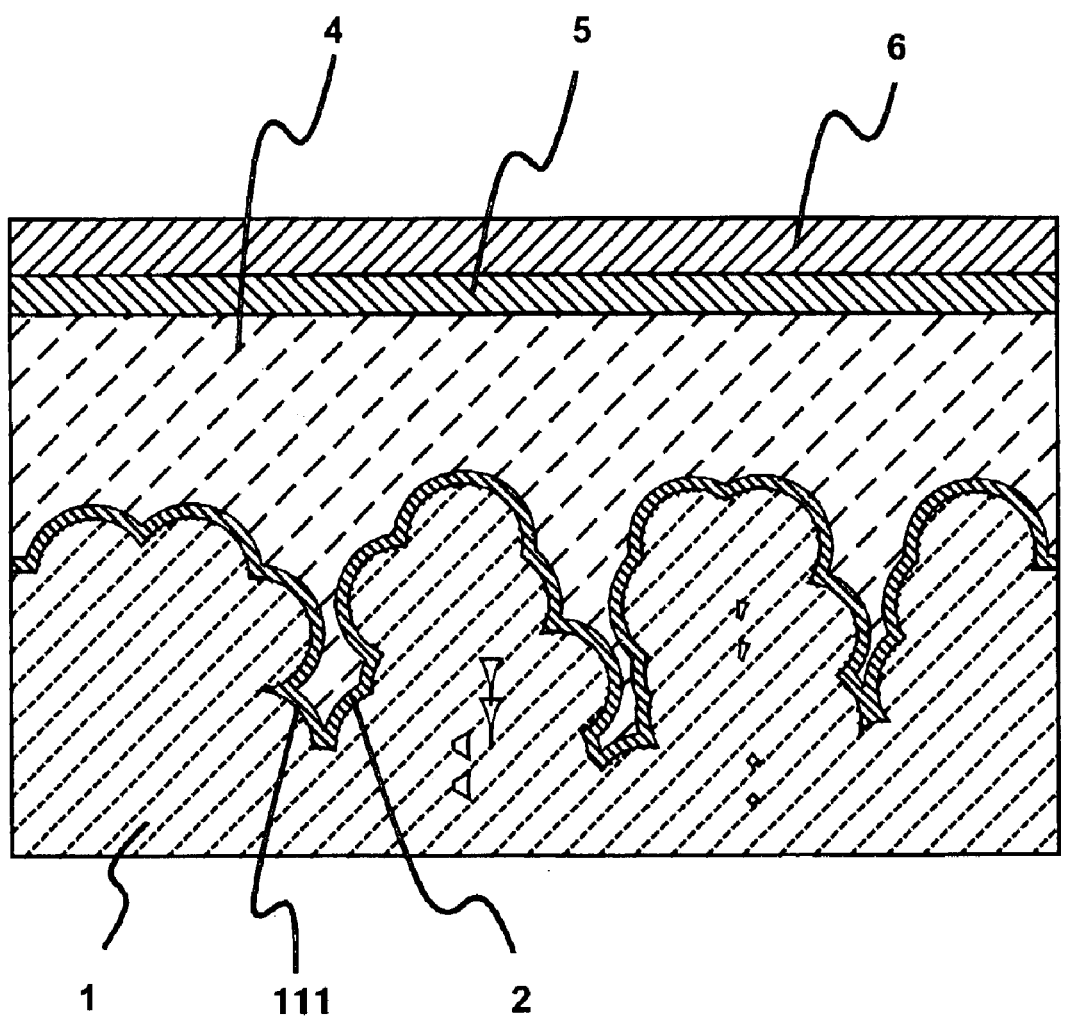
FIG. 2 is a partial enlarged sectional view schematically showing a structure of a portion of the first embodiment of the Nb solid electrolytic capacitor according to the present invention.

FIG. 2 is a partial enlarged sectional view schematically showing a structure of a portion of the capacitor element of the first embodiment of the Nb solid electrolytic capacitor according to the present invention.

As shown in FIG. 2, the capacitor element of the solid electrolytic capacitor according to the present invention comprises an anode body 1 which is made of a sintered product made from an Nb-based material and having a large number of irregularities in its surface and interior and which has a nitrogen content of about 7,500 ppm to about 47,000 ppm, a dielectric layer 2 formed over the surface of the anode body 1, a solid electrolyte layer 4 formed on the dielectric layer 2, a cathode body 5 (graphite paste layer) formed on the solid electrolyte layer 4, and a silver(Ag)-containing paste layer 6 formed on the cathode body 5.

By virtue of the fact that the anode body 1 has a nitrogen content in the above-mentioned range, formation of non-stoichiometric Nb oxides is suppressed in the vicinity of the interface 111 between the anode body 1 and the dielectric layer 2.

Since metallic Nb has a high affinity for oxygen, metallic Nb is very prone to capture oxygen contained in an atmosphere to which metallic Nb is exposed or a matter which metallic Nb contacts to form oxides. The Nb oxides are not necessarily stoichiometric Nb oxide: $Nb_2O_5$, and non-stoichiometric Nb oxides: $Nb_2O_{5-x}$ wherein x is a positive number smaller than 5 can also be formed. If non-stoichiometric Nb oxides are present in the vicinity of the interface 111 between the anode body 1 and the dielectric layer 2, the non-stoichiometric Nb oxides behave as an additional dielectric layer of the capacitor. In relation thereto, since the non-stoichiometric Nb oxides are a kind of n n-type semiconductor, voltage dependence in capacity of the capacitor is caused. Accordingly, such a capacitor that non-stoichiometric Nb oxides present in the vicinity of the interface 111 between the anode body 1 and the dielectric layer 2 behave as an additional dielectric layer shows bias dependence.

Metallic Nb has a high affinity for oxygen and is thus very prone to capture oxygen contained in an atmosphere to which metallic Nb is exposed or a matter which metallic Nb contacts to form oxides. Due to the high proneness of metallic Nb to form oxides, however, Nb2O5 as the stoichiometric Nb oxide is less likely to be formed. Accordingly, if an atmosphere to which it is exposed or a matter which it contacts has a low oxygen content, non-stoichiometric Nb oxides are likely to be formed.

However, when the anode body has a nitrogen content of about 7,500 ppm or higher, formation of non-stoichiometric Nb oxides is suppressed. Consequently, bias dependence of the Nb solid electrolytic capacitor is effectively suppressed.

Further, when the anode body 1 has a nitrogen content of about 12,000 ppm or higher, the Nb solid electrolytic capacitor shows no substantial bias dependence.

Incidentally, an anode body made from an Nb-based material generally has a nitrogen content of about several hundreds to about 2,000 ppm. In recent years, as a starting material of an anode body, an Nb powder having a nitrogen content of about 3,000 ppm has been provided.

On the other hand, if the anode body has a nitrogen content exceeding about 47,000 ppm, for example, a nitrogen content of 79,000 ppm, the anode body in the form of a porous body is highly likely to be cracked due to the excess nitriding of Nb to undergo lowering of its mechanical strength. Further, if the anode body has a higher nitrogen content, the solid electrolytic capacitor has a lower capacity. Accordingly, such excess nitriding of Nb results in impairment of the basic function of the solid electrolytic capacitor.

Therefore, the anode body 1 according to this embodiment of the present invention has a nitrogen content of about 7,500 ppm to about 47,000 ppm, preferably, about 12,000 ppm to about 22,000 ppm.

As described above, an excess nitrogen content of the anode body gives rise to lowering of the capacity of the capacitor. Accordingly, the capacitor preferably comprises such an anode body that its nitrogen content is higher in the vicinity of the interface with the dielectric layer where non-stoichiometric Nb oxides are formed than in the interior. Such an anode body is less susceptible to formation of non-stoichiometric Nb oxides, and lowering in capacity of the capacitor due to the fact that total nitrogen amount the anode body contains is small.

In the next place, an embodiment of the method for preparing the Nb solid electrolytic capacitor according to the present invention will be described below with reference to the drawing.

Figure 3:
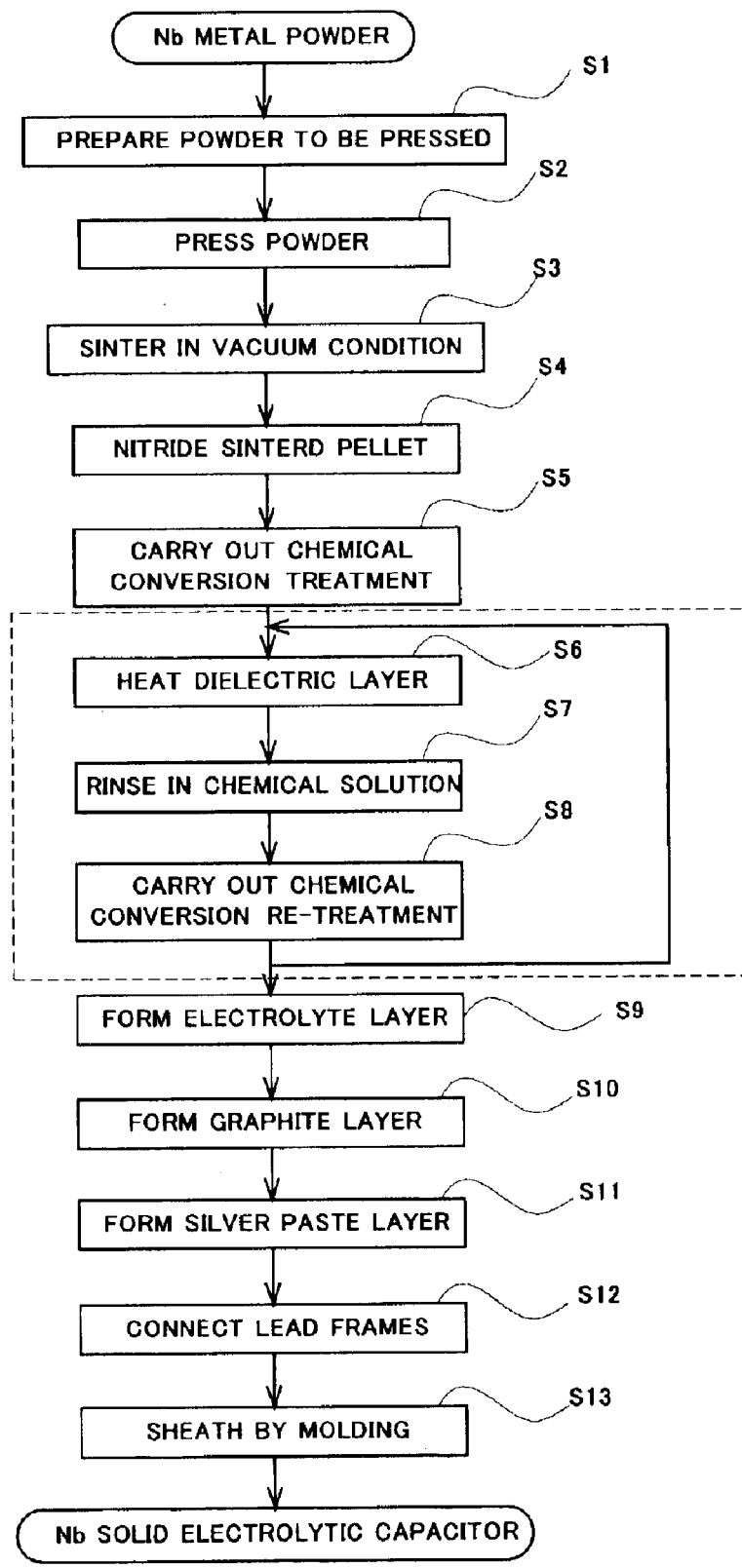
FIG. 3 is a flow chart showing a main part of the first embodiment of the method for preparing an Nb solid electrolytic capacitor according to the present invention.

FIG. 3 is a flow chart showing the embodiment of the method for preparing the Nb solid electrolytic capacitor according to the present invention.

As shown in FIG. 3, (Step 1: S1) Preparation of Nb-based Powder

A binder is added to an Nb powder having an average particle size of 0.1 to 100 μm, and the addition is followed by mixing to prepare an Nb-based agglomerated powder.

(Step 2: S2) Press Molding

Using 0.01 g to 0.5 g of the agglomerated Nb-based powder, an lead wire made of metallic Nb is partially inserted in the agglomerated powder, and the resultant is compression-molded by press-molding method to prepare a compression-molded product ready to be sintered into an anode body comprising an Nb porous body and the lead wire made of metallic Nb.

(Step 3: S3) Sintering under Vacuum

The compression-molded product is sintered in a sintering furnace at a temperature of about 1,000° C. to about 1,400° C. under high vacuum of about $10^{-4}$ Pa or higher vacuum for about 15 to about 60 min to form an anode comprising an Nb porous body and the lead wire made of metallic Nb.

(Step 4: S4) Nitriding

Then, the product resulting from the sintering under vacuum of S3, i.e., the sintered body is preferably kept in the sintering furnace and, in this condition, the product is cooled. In the course of the cooling, nitrogen gas is introduced into the sintering furnace to effect nitriding of the product. For the nitriding, temperatures of about 100° C. to about 600° C. are appropriate, and the product is kept in an atmosphere having nitrogen gas pressure of about 10 to about 600 Torr for about 1 to about 30 min. In this step, the sintered body is nitrided to form an anode body having an increased nitrogen content.

In this embodiment of the present invention, the anode body has a nitrogen content of about 7,500 ppm to about 47,000 ppm.

By virtue of the fact that the anode body has a nitrogen content of about 7,500 ppm or higher, formation of non-stoichiometric Nb oxides resulting from reaction of Nb present in the surface portion of the Nb porous body with oxigen in air is effectively suppressed. The Nb solid electrolytic capacitor comprising an anode body containing no substantial non-stoichiometric Nb oxides is substantially free from bias dependence.

On the other hand, if the anode body has a nitorgen content exceeding about 47,000 ppm, for example, a nitrogen content of 79,000 ppm, the anode body in the form of a porous body is highly likely to be cracked due to the excess nitriding of Nb to undergo lowering of its mechanical strength. Further, if the anode body has a higher nitrogen content, the solid electrolytic capacitor has a lower capacity. Accordingly, such excess nitriding of Nb results in impairment of the basic function of the solid electrolytic capacitor.

It is particularly preferred that the anode body have a nitrogen content of about 12,000 ppm to about 22,000 ppm.

The Nb solid electrolytic capacitor so prepared that its anode body has a nitrogen content in the above-mentioned range shows a rate of bias-dependent variation of almost 0% and thus has substantially bias dependence-free characteristics.

Further, after the sintering under vacuum, the sintered body comprising the Nb porous body and the lead wire made of metallic Nb is subjected to the nitriding preferably without having been exposed to air, as described above. If the sintered body is exposed to air (prior to the nitration), oxygen contained in air is strongly adsorbed on the surface of the sintered body because of high affinity of metallic Nb for oxygen and there is concern that the oxygen on the surface of the sintered body prevents the efficiency of the nitriding step.

In this embodiment, the nitriding is conducted during the cooling subsequent to the sintering. However, the nitriding may not necessarily be performed during the cooling. For example, the nitriding may be conducted in such a manner that the sintered body is cooled to room temperature and then re-heated in a nitrogen atmosphere to a predetermined temperature. In this case, the sintered body may be re-heated while being exposed to atmospheric environment, after the cooling. However, it is preferred that the sintered body not be exposed to an oxygen-rich atmosphere such as air until nitrided areas are formed in the surface portion of the sintered body by the re-heat treatment.

In this embodiment, the nitriding is effected by placing the Nb porous body having a high temperature in a nitrogen atmosphere. However, the manner for the nitriding in the present invention is not restricted thereto. As an atmosphere, ammonia may be used. Further, the Nb porous body may be soaked in a cyanide bath or may be irradiated with a nitrogen source in the form of ion beam. In this connection, it is preferred that the nitrogen source be so supplied to the Nb sintered body as to progress the nitriding of the Nb porous body in the direction from the surface toward the interior of the Nb porous body. Because excess nitrogen content of the anode body causes increase of leakage current or cracks in the anode body, it is ideally preferred that only the portion in the vicinity of the surface of the anode body contain nitrogen. By externally supplying the nitrogen source to the Nb porous body so as to progress the nitriding of the Nb porous body in the direction from the surface toward the interior of the Nb porous body, it is realized that the nitrogen content is higher in the surface portion of the anode body than in the interior of the anode body. The Nb solid electrolytic capacitor comprising an anode body prepared by such a process is excellent not only in substantially bias dependence-free characteristics but also in small leakage current.

(Step 5: S5) Formation of Dielectric Layer (Chemical Conversion Treatment)

After the completion of the nitriding of the anode body, a dielectric layer is formed over the surface of the nitrided anode body by anodic oxidation method as employed in the conventional preparation method. Specifically, the Nb porous body of the anode body is soaked in an electrolytic aqueous solution such as an aqueous solution of phosphoric acid, boric acid, sulfuric acid or oxalic acid together with a counter electrode, and a chemical conversion voltage (formation voltage) is applied to thereby form an oxidized Nb layer as a dielectric layer over the surface of the Nb porous body of the anode body.

The thus formed dielectric layer substantially consists of $Nb_2O_5$. However, non-stoichiometric Nb oxides which impair function of the capacitor can be contained in the dielectric layer.

In the following description, the anode body with the dielectric layer formed over the surface thereof in this manner will be also referred to as a chemically converted body.

(Step 6: S6) Heat treatment

Then, the Nb porous body with the dielectric layer is heated in air to a temperature of about 100° C. to about 300° C. and kept at the temperature for about 10 seconds or longer and is then allowed to cool.

The non-stoichiometric Nb oxides which can be contained in the dielectric layer in a small amount are lower in mechanical strength than the stoichiometric Nb oxide: $Nb_2O_5$. Because of this, the portions of the non-stoichiometric Nb oxides are cracked in preference to the rest portion of $Nb_2O_5$ by mechanical stress caused by the heat treatment. By occurrence of cracks, non-stoichiometric Nb oxides formed in the interior of the dielectric layer are exposed.

Such exposed portions will be brought into contact with an acid-containing aqueous solution in the chemical cleaning and an electrolytic solution in the re-chemical conversion which will be subsequently conducted. Accordingly, the non-stoichiometric Nb oxides present in the exposed portions are likely to be dissolved or chemically converted to the stoichiometric Nb oxide. Consequently, the non-stoichiometric Nb oxides are effectively removed.

The heat treatment is preferably performed at a temperature of about 100° C. or higher, because about 100° C. is the lower limit temperature to effectively yield thermal stress. On the other hand, as a rule, the higher the temperature of the heat treatment, the better the result. However, when the heat treatment is performed in an oxygen-containing atmosphere such as air, the temperature of the heat treatment is preferably about 300° C. or lower. This is because about 300° C. is the upper limit of temperatures at which metallic Nb does not undergo no substantial oxidation by heating in air.

Further, by keeping the Nb porous body at the temperature of the heat treatment for about 10 seconds or longer, effect of the heat treatment is ensured.

(Step 7: S7) Chemical Cleaning

After completion of the heat treatment, an aqueous solution of an acid is applied to the Nb porous body to carry out chemical cleaning. As the aqueous solution of an acid, for example, 1 to 20 wt. % aqueous solution of nitric acid or sulfuric acid may be used. As a method for applying the aqueous solution of an acid to the Nb porous body, there may be employed soaking of the Nb porous body in the aqueous solution, spraying the aqueous solution on the Nb porous body, brushing the aqueous solution onto the Nb porous body, pressing a soft porous body such as a sponge impregnated with the aqueous solution against the Nb porous body, or the like.

By the chemical cleaning, the non-stoichiometric Nb oxides are removed antecedent to the stoichiometric Nb oxide. This is based on the fact that the non-stoichiometric Nb oxides is more susceptible to acid attack than the stoichiometric Nb oxide as the desirable oxide.

Since the non-stoichiometric Nb oxides has been cracked and thereby exposed in S6, the non-stoichiometric Nb oxides are effectively dissolved in this step.

(Step 8: S8) Re-Treatment for Chemical Conversion

Subsequently, excluding the lead wire made of metallic Nb, the resulting anode body is subjected again to chemical conversion treatment by anodic oxidation method.

The cracks have been formed by the mechanical stress derived from the heat treatment in S6, and the non-stoichiometric Nb oxides have been removed by the chemical cleaning in S7. In consequence, voids have been formed in the dielectric layer to cause reductions in thickness of the dielectric layer and exposures of metallic Nb. Accordingly, in this step, Nb oxides are formed by re-subjecting the anode body to the chemical conversion treatment with a view to repair the dielectric layer.

The chemical conversion treatment in this step may be conducted under the same conditions as in S5. It is, however, preferred that the formation voltage in this step be lower than that in the chemical conversion treatment in S5. This is because the formation of the oxidized layer in this step antecedently proceeds at portions of which thicknesses are smaller than the average thickness of the originally formed dielectric layer.

As a result, in the portion of the dielectric layer in which the oxidized layer has a substantially intended thickness and which accounts for the great majority of the dielectric layer, increase in thickness of the oxidized layer is less likely to occur by this re-chemical conversion. In other words, this re-chemical conversion gives rise to substantially no increase or only minor increase in thickness of the oxidized layer.

Accordingly, variation in average thickness of the dielectric layer after the re-chemical conversion is small. This enables preparation of the Nb solid electrolytic capacitor having a capacity substantially as intended.

The series of the treatments in S6 to S8 is repeated, for example, 10 times. By repeatedly conducting the series of the treatments, non-stoichiometric Nb oxides formed in the re-chemical conversion treatments are effectively removed. When the dielectric layer consists substantially of $Nb_2O_5$ after repeating the series of the treatments multiple times, no substantial non-stoichiometric Nb oxides to be cracked in S6 or to be dissolved in S7 are present. Accordingly, preferable number of times of the repetition depends upon the conditions of the treatments in S6 to S8.

It should be noted that each of the heat treatment (S6), the chemical cleaning (S7), the re-chemical conversion (S8), and the repetition thereof may appropriately be omitted in the preparation of the Nb solid electrolytic capacitor. In other words, the treatments in S6 to S8 may be omitted en masse or may be employed alone or in combination and conducted once or repeatedly in the preparation of the Nb solid electrolytic capacitor.

(Step 9: S9) Formation of Solid Electrolyte Layer

In this embodiment, for formation of a solid electrolyte layer on the surface of the product resulting from S8 (if any omission was made with respect to the treatments in S6 to S8, the product resulting from the immediately preceding step), an electrically conductive polymer is used.

As the electrically conductive polymer, there may be used an electrically conductive polymer obtained by polymerizing a monomeric material such as pyrrole, thiophene, aniline, furan or a derivative thereof.

To form the solid electrolyte layer (the electrically conductive polymer), for example, chemical oxidative polymerization method is used. First, an oxidizing agent-containing solution is prepared by dissolving an oxidizing agent such as ferric benzenesulfonate, ferric toluenesulfonate, ferric naphthalenesulfonate or iron trichloride in a mixed solvent of water and an alcohol such as ethyl alcohol, methyl alcohol, propyl alcohol or the like. The anode body provided with the dielectric layer is soaked in the oxidizing agent-containing solution and then dried, and the resultant is then soaked in a solution of the monomeric material for forming the electrically conductive polymer.

In this embodiment, the solid electrolyte layer formed by the above-described method has a thickness of about 10 $\mu$m to about 20 $\mu$m according to the specifications for the capacitor.

(Step 10: S10) Formation of Graphite Layer and (Step 11: S11) Formation of Silver(Ag)-Containing Paste Layer On the surface of the product resulting from S9, a graphite layer as a cathode body is formed. Further, a silver(Ag)-containing paste layer is formed on the cathode body to improve connection between the cathode body and a cathode terminal. In this embodiment, each of these layers has a thickness of about 20 $\mu$m to about 50 $\mu$m according to the specifications for the capacitor.

(Step 12: S12) Connection of Lead Frames and (Step 13: S13) Sheathing by Molding Further, a lead frame for the anode is connected to the lead wire of the anode body by spot welding, and a lead frame for the cathode is connected to the silver(Ag)-containing paste layer with an electrically conductive adhesive containing silver flakes. Then, the resultant is sheathed with an epoxy resin with end portions of the lead frames out to thereby obtain an Nb solid electrolytic capacitor comprising the nitrogen-containing anode body.

Subsequently, the second embodiment of the Nb solid electrolytic capacitor according to the present invention and the second embodiment of the method for preparing the same will be described with reference to the drawing.

Figure 7:
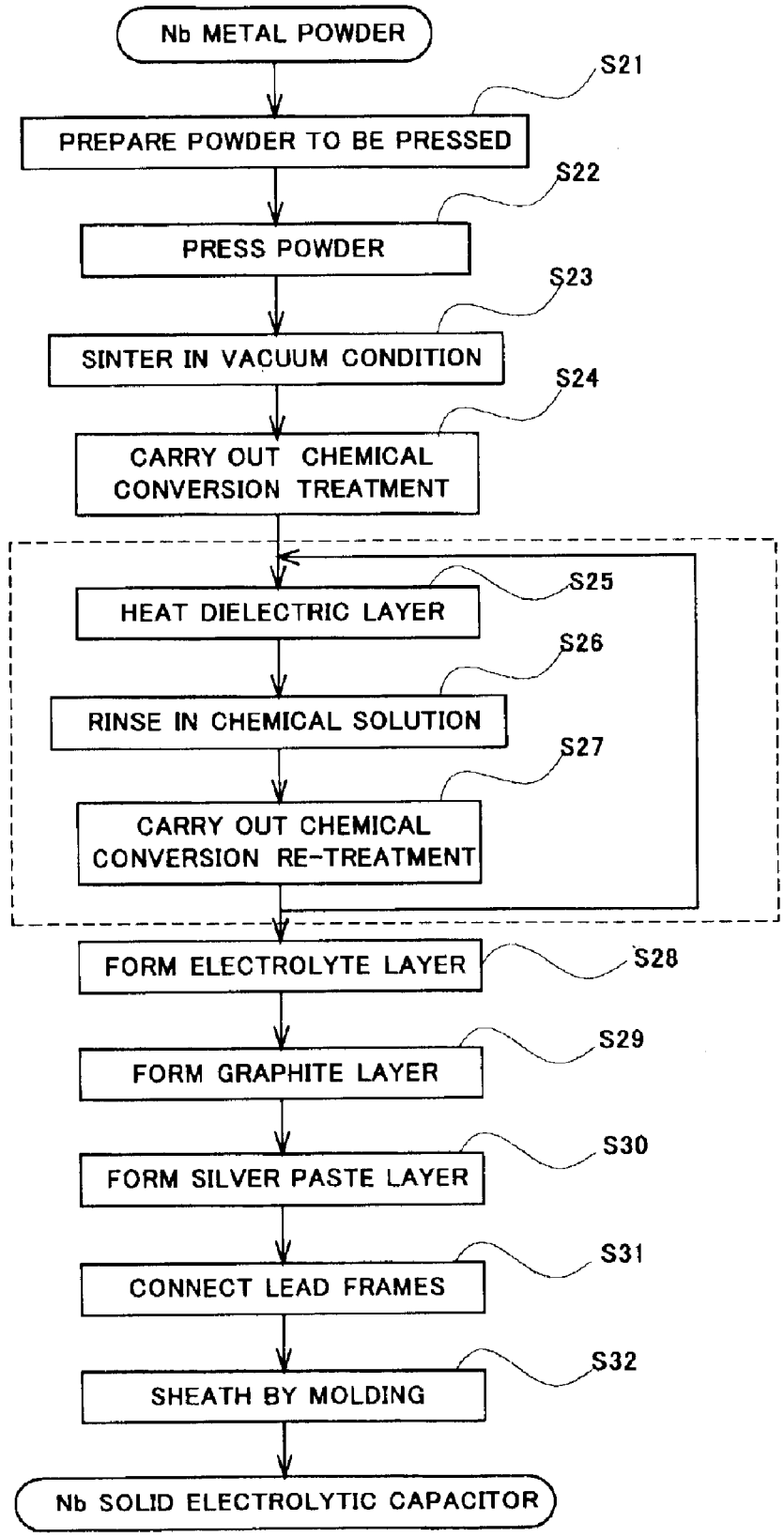
FIG. 7 is a flow chart showing a main part of the second embodiment of the method for preparing an Nb solid electrolytic capacitor according to the present invention.

FIG. 7 is a flow chart showing the second embodiment of the method for preparing the second embodiment of the Nb solid electrolytic capacitor.

As shown in FIG. 7, in the same manner as in the first embodiment, an Nb-based powder is first prepared (Step 21: S21), and press-molding is performed (Step 22: S22), and sintering under vacuum is subsequently conducted to form an anode body comprising an Nb porous body and a lead wire made of metallic Nb (Step 23: S23). After the sintering under vacuum in S23, the anode body is cooled while being kept in the vacuum condition, as in the conventional technique. Then, chemical conversion treatment is conducted in the same manner as in the first embodiment to form a dielectric layer over the surface of the Nb porous body of the anode body (Step 24: S24). The chemical conversion liquid used in S24 is of the same type and concentration as in the first embodiment.

The anode body provided with the dielectric layer is subjected to heat treatment (Step 25: S25) in such a manner that it is heated in air to a temperature of about 100° C. to about 300° C. and kept at the temperature for about 10 seconds or longer and is then allowed to cool. The same preferred conditions of the heat treatment as in the first embodiment apply to the heat treatment of this embodiment. After the heat treatment, chemical cleaning is conducted in the same manner as in the first embodiment (Step 26: S26). Subsequently, the surface of the anode body exclusive of the lead wire made of metallic Nb is subjected again to chemical conversion treatment by anodic oxidation (Step 27: S27). The same preferred condition of the re-chemical conversion treatment as in the first embodiment applies to the re-chemical conversion treatment of this embodiment.

It is preferred that the series of the treatments in S25 to S27 be conducted repeatedly. With respect to the number of times of the repetition, the same upper limit as in the first embodiment applies to this embodiment.

In this connection, the chemical cleaning (S26) may appropriately be omitted. Further, the treatments S25 and S27 may be conducted repeatedly.

The product resulting from the immediately preceding step, i.e. S27, is subjected, in the same manner as in the first embodiment, to formation of a solid electrolyte layer (Step 28: S28), formation of a graphite layer (Step 29: S29), formation of a silver(Ag)-containing layer (Step 30: S30), connection of lead frames (Step 31: S31) and sheathing by molding (Step 32: S32) to obtain an Nb solid electrolytic capacitor.

The Nb solid electrolytic capacitor obtained by the second embodiment of the preparation method as described above is substantially the same in appearance as the Nb solid electrolytic capacitor obtained by the conventional preparation method. However, these are clearly different in their bias dependences because the former is prepared by the method further comprising the steps S25 to S27 or S25 and S27 which are additional relative to the conventional method for preparing the latter. By virtue thereof, the former contains non-stoichiometric Nb oxides in its dielectric layer in a considerably smaller amount as compared with the latter. Accordingly, the former has a bias dependence considerably smaller than that of the former.

EXAMPLES

The following specific Examples are given by way only of illustrations for more clear understanding of the present invention and not given by way of limitation on the scope of the present invention. It is, therefore, to be understood that the scope of the present invention is by no means restricted to the specific Examples.

Example 1

0.1 g of a metallic niobium-based powder in which an element lead wire made of niobium is partially inserted and which has an average particle diameter of about 100 $\mu$m was charged into a pelleter and pressed (S1, S2), the resulting product was placed in a sintering furnace and sintered at a temperature of 1,300° C. in a vacuum atmosphere of $10^{-4}$ Pa or higher vacuum to obtain a sintered pellet in the form of a porous body having a parallelepipedonal shape (S3).

Subsequently, nitrogen gas was introduced into the sintering furnace with the sintered pellet still placed therein to obtain a nitrided pellet as an anode body (Step 4: S4). The nitrogen gas was introduced when the temperature in the sintering furnace was 300° C. and the pressure of the nitrogen gas introduced as an atmosphere in the sintering furnace was 300 Torr.

With respect to two anode pellets prepared using 0.2 g of the same material as the above-described anode pellet and sintered and nitrided concurrently with the preparation and the sintering and the nitriding of the above-described anode pellet, respectively, nitrogen content and oxygen content were measured by the thermal conductivity method and the non-dispersive infrared absorption method, respectively, using an oxygen/nitrogen analyzer of EMGA-500 model produced by Horiba, Ltd. As a result, the nitrogen content and the oxygen content were found to be 14,000 ppm and 7,900 ppm, respectively.

With respect also to two anode pellets prepared using 0.2 g of the same material as the above-described anode pellet and sintered in a sintering furnace and cooled to room temperature in the sintering furnace after the sintering S3 without being subjected to the nitriding S4 as in the conventional preparation method, the same measurements were conducted. As a result, the nitrogen content and the oxygen content were found to be 3,000 ppm and 8,500 ppm, respectively.

The nitrided anode pellet was soaked in an aqueous solution of 0.6 vol. % phosphoric acid and subjected to anodic oxidation at a voltage of 20 volt for 300 minutes until the formation current was saturated to thereby form such a dielectric layer that the finally obtained capacitor had a capacity of 220 $\mu$F (Step 5: S5).

Then, the anode pellet provided with the dielectric layer was heated in air to 300° C. and kept at the temperature for at least 10 seconds and then allowed to cool (Step 6: S6).

After completion of S6, the anode pellet was soaked in an aqueous solution of 10 wt. % nitric acid for 30 minutes to effect chemical cleaning of the surface of the anode pellet (Step 7: S7).

After the completion of the chemical cleaning, the resulting anode pellet was re-subjected to anodic oxidation to repair the dielectric layer (Step 8: S8).

The series of Step 6 to Step 8 was further repeated 9 times.

The anode pellet which has been subjected to the repeatedly conducted series of the Steps was soaked in an oxidizing agent solution prepared by dissolving 400 g of ferric benzenesulfonate in 1000 g of an alcohol at room temperature for 5 minutes, and then dried.

Subsequently, the resulting pellet was soaked in an aqueous solution which contained 5 to 7 vol. % of pyrrole as a monomeric material for 1 minute and then air-dried. The soaking in the oxidizing agent solution and the drying subsequent thereto, and the soaking in the monomer-containing solution and the drying subsequent thereto were repeated multiple times to thereby form an electrolyte layer (Step 9: S9).

Thereafter, the resultant was soaked in a graphite paste obtained by mixing 5% by weight of a binder prepared by mixing a polymethyl methacrylate resin and an acetylcellulose at a weight ratio of 4:1, 15% by weight of a graphite powder, and 80% by weight of pure water. The soaking was repeated several times so as to apply the graphite paste in a thickness of 30 $\mu$m. Subsequently, the applied graphite paste was cured at a high temperature of 150° C. for 30 minutes to form a graphite paste layer as a cathode body (Step 10: S10).

Then, a silver(Ag)-containing paste layer was formed on the cathode body (Step 11: S11). A lead frame for the anode body was connected to the element lead wire of the anode body by spot welding, and a lead frame for the cathode body was connected to the silver(Ag)-containing paste layer with an electrically conductive adhesive containing silver flakes (Step 12: S12). Finally, the resulting capacitor element was sheathed with a resin (epoxy resin) by molding with end portions of the lead frames out to obtain an Nb solid electrolytic capacitor (Step 13: S13).

Example 2

An Nb solid electrolytic capacitor was prepared in the same manner as in Example 1 except that after the nitriding S4, the anode body had a nitrogen content of 7,500 ppm.

Example 3

An Nb solid electrolytic capacitor was prepared in the same manner as in Example 1 except that after the nitriding S4, the anode body had a nitrogen content of 11,000 ppm.

Example 4

An Nb solid electrolytic capacitor was prepared in the same manner as in Example 1 except that after the nitriding S4, the anode body had a nitrogen content of 22,000 ppm.

Example 5

An Nb solid electrolytic capacitor was prepared in the same manner as in Example 1 except that after the nitriding S4, the anode body had a nitrogen content of 7,500 ppm, and that the chemical cleaning S7 was omitted.

Example 6

An Nb solid electrolytic capacitor was prepared in the same manner as in Example 5 except that after the nitriding S4, the anode body had a nitrogen content of 11,000 ppm.

Example 7

An Nb solid electrolytic capacitor was prepared in the same manner as in Example 5 except that after the nitriding S4, the anode body had a nitrogen content of 14,000 ppm.

Example 8

An Nb solid electrolytic capacitor was prepared in the same manner as in Example 5 except that after the nitriding S4, the anode body had a nitrogen content of 22,000 ppm.

Example 9

An Nb solid electrolytic capacitor was prepared in the same manner as in Example 1 except that after the nitriding S4, the anode body had a nitrogen content of 7,500 ppm, and that the heat treatment S6 and the chemical cleaning S7 were omitted.

Example 10

An Nb solid electrolytic capacitor was prepared in the same manner as in Example 9 except that after the nitriding S4, the anode body had a nitrogen content of 11,000 ppm.

Example 11

An Nb solid electrolytic capacitor was prepared in the same manner as in Example 9 except that after the nitriding S4, the anode body had a nitrogen content of 14,000 ppm.

Example 12

An Nb solid electrolytic capacitor was prepared in the same manner as in Example 9 except that after the nitriding S4, the anode body had a nitrogen content of 11,000 ppm.

Example 13

An Nb solid electrolytic capacitor was prepared in the same manner as in Example 11 except that the re-chemical conversion S8 was omitted.

Example 14

An Nb solid electrolytic capacitor was prepared in the same manner as in Example 5 except that the heating temperature in the heat treatment S6 was 150° C., and that the heat treatment S6 and the re-chemical conversion S8 were repeated once although the number of times of the repetition in Example 5 was nine.

Example 15

An Nb solid electrolytic capacitor was prepared in the same manner as in Example 14 except that the heating temperature in the heat treatment S6 was 200° C.

Example 16

An Nb solid electrolytic capacitor was prepared in the same manner as in Example 14 except that the heating temperature in the heat treatment S6 was 260° C.

Example 17

An Nb solid electrolytic capacitor was prepared in the same manner as in Example 14 except that the heating temperature in the heat treatment S6 was 300° C.

Example 18

An Nb solid electrolytic capacitor was prepared in the same manner as in Example 14 except that the nitriding S4 was omitted.

Example 19

An Nb solid electrolytic capacitor was prepared in the same manner as in Example 16 except that after the nitriding S4, the anode body had a nitrogen content of 47,000 ppm.

Comparative Example 1

An Nb solid electrolytic capacitor was prepared in the same manner as in Example 13 except that the nitriding S4 was omitted.

Comparative Example 2

An Nb solid electrolytic capacitor was prepared in the same manner as in Example 14 except that the heating S6 was omitted.

Comparative Example 3

An Nb solid electrolytic capacitor was prepared in the same manner as in Example 16 except that after the nitriding, the anode body had a nitrogen content of 79,000 ppm.

The capacities and the rates of bias-dependent variation of the Nb solid electrolytic capacitor derived from Example 1 to 19 and Comparative Example 1 to 3 were measured and summarized in Table 1 with showing the steps thereof.

TABLE 1

| Embodiment 1 # | S4 N, ppm | S5 / S24 treatment | S6 / S25 T, degree C. | S7 / S26 solution | S8 / S27 retreatment | iteration of Steps S6–S8 or Steps S24–27 | C, μF at 1.5 V, 120 Hz | R, % |
|---|---|---|---|---|---|---|---|---|
| Example | | | | | | | | |
| 1 | 14000 | ○ | 300 | 6 wt % HNO$_3$ | ○ | 10 | 280 | 0 |
| 2 | 7500 | ○ | 300 | 6 wt % HNO$_3$ | ○ | 10 | 300 | 1 |
| 3 | 11000 | ○ | 300 | 6 wt % HNO$_3$ | ○ | 10 | 290 | 0.1 |
| 4 | 22000 | ○ | 300 | 6 wt % HNO$_3$ | ○ | 10 | 260 | 0 |
| 5 | 7500 | ○ | 300 | — | ○ | 10 | 300 | 2.2 |
| 6 | 11000 | ○ | 300 | — | ○ | 10 | 290 | 0.1 |
| 7 | 14000 | ○ | 300 | — | ○ | 10 | 280 | 0 |
| 8 | 22000 | ○ | 300 | — | ○ | 10 | 260 | 0 |
| 9 | 7500 | ○ | — | — | ○ | 10 | 290 | 6 |
| 10 | 11000 | ○ | — | — | ○ | 10 | 265 | 5.1 |
| 11 | 14000 | ○ | — | — | ○ | 10 | 260 | 5 |
| 12 | 22000 | ○ | — | — | ○ | 10 | 250 | 5 |
| 13 | 14000 | ○ | — | — | — | 0 | 250 | 5 |
| 14 | 7500 | ○ | 150 | — | ○ | 2 | 290 | 14 |
| 15 | 7500 | ○ | 200 | — | ○ | 2 | 290 | 8 |
| 16 | 7500 | ○ | 260 | — | ○ | 2 | 290 | 6 |
| 17 | 7500 | ○ | 300 | — | ○ | 2 | 290 | 4 |
| 18 | (3000) | ○ | 300 | — | ○ | 10 | 360 | 8 |
| 19 | 47000 | ○ | 260 | — | ○ | 2 | 211 | 4.7 |
| Comp. | | | | | | | | |
| 1 | (3000) | ○ | — | — | — | 0 | 330 | 18 |
| 2 | 7500 | ○ | — | — | ○ | 2 | 280 | 17 |
| 3 | 79000 | ○ | 260 | — | ○ | 2 | 190 | 6.3 |

Influence of Nitriding

Figure 4:
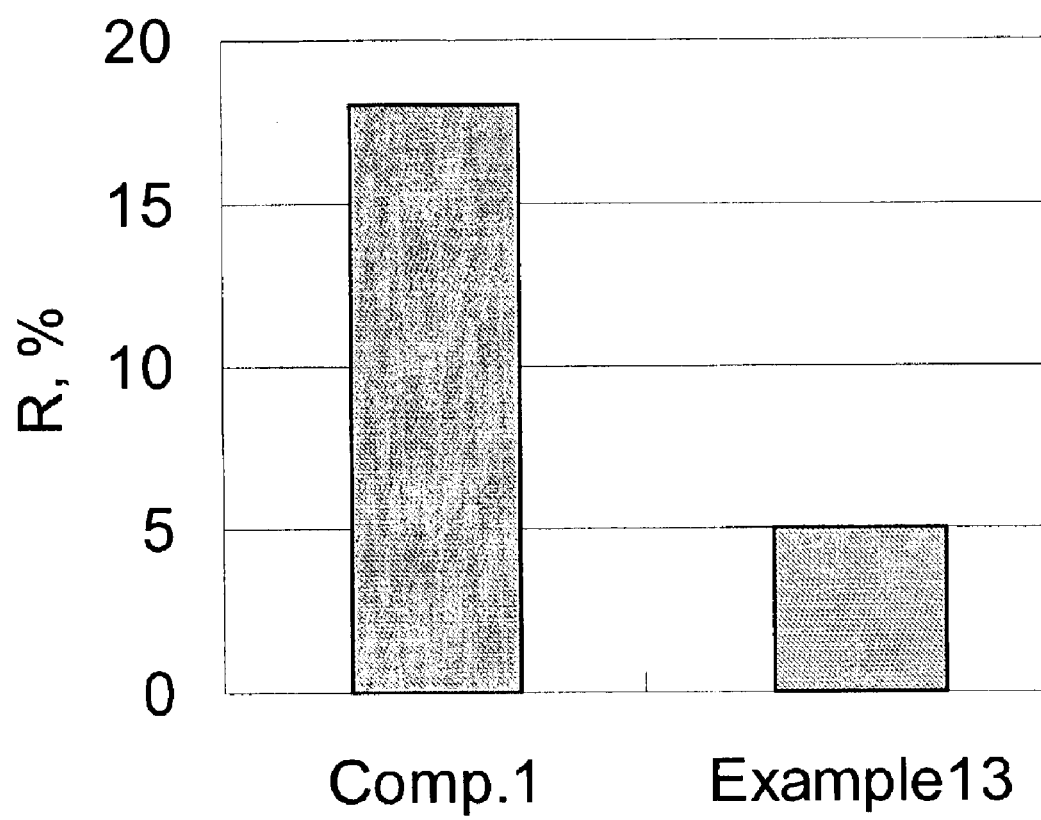
FIG. 4 is a graphical representation showing the result of comparison between the rate of bias-dependent variation of the Nb solid electrolytic capacitor prepared by the first embodiment of the method according to the present invention and that of the Nb solid electrolytic capacitor prepared by the conventional preparation method.

To confirm effectiveness of the nitriding, the rates of bias-dependent variation of the Nb solid electrolytic capacitors obtained by the preparation methods in Example 13 and Comparative Example 1 were compared. The results are shown in FIG. 4. By virtue of the addition of the nitriding, the rate of bias-dependent variation of the Nb solid electrolytic capacitor was remarkably improved from 18% to 5%.

Influence of Nitorgen Content of Anode Body on Bias Dependence

With respect to the Nb solid electrolytic capacitors according to the present invention, relationships between the nitrogen content and the rate of bias-dependent variation were evaluated. The results are shown in FIG. 5.

Figure 5:
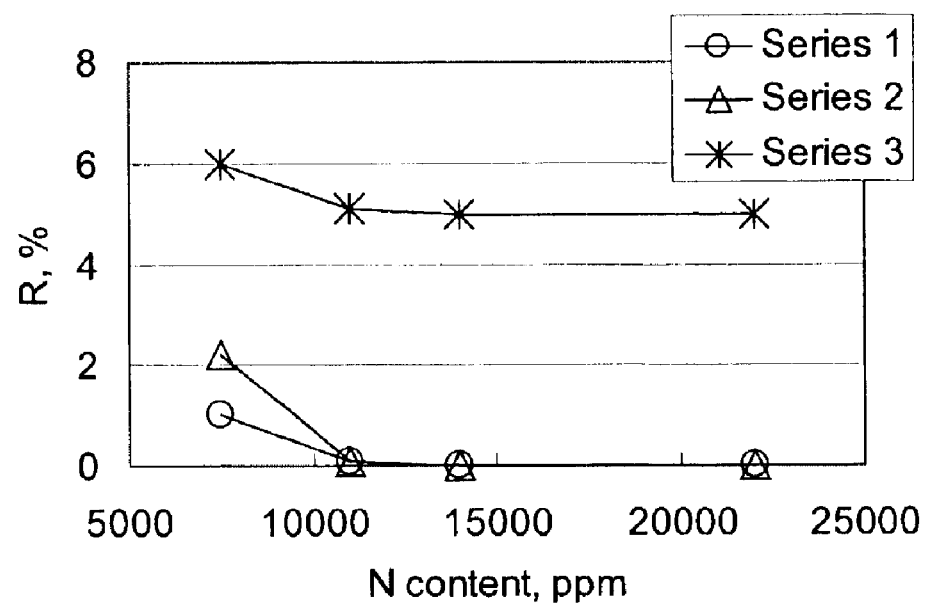
FIG. 5 is a graphical representation showing the result of evaluations of relationships between nitrogen content of the anode body and rate of bias-dependent variation, with respect to the Nb solid electrolytic capacitors prepared in three series of Examples by three modes of the first embodiment of the preparation method according to the present invention

FIG. 5, Examples 1 to 4, Examples 5 to 8 and Examples 9 to 12 are shown as Series 1, Series 2 and Series 3 and represented by circles, triangles and asterisks, respectively. In any Series, it is shown that increase in nitrogen content of the anode body leads to reduction in rate of bias-dependent variation, and that when the nitrogen content becomes more than about 10,000 ppm, no substantial differences in rate of bias-dependent variation are observed. In other words, the effect of the nitrogen content on reduction in rate of bias-dependent variation is substantially saturated.

Further, comparison between Series 1 and Series 2 shows that in the present invention, influence of the chemical cleaning S7 on reduction in rate of bias-dependent variation is relatively small. On the other hand, comparison between Series 2 and Series 3 shows that in the present invention, influence of the heat treatment S6 on reduction in rate of bias-dependent variation is relatively large.

Influence of Heat Treatment

Using the Nb solid electrolytic capacitors prepared in Examples 14 to 17 and Comparative Example 2, influence of the heat treatment S6 in the preparation method according to the present invention on rate of bias-dependent variation was evaluated. The results are shown in FIG. 6.

The results of the cases where the heat treatment had been conducted are shown by circles, and the result of the case where the heat treatment had not been conducted is shown by a triangle.

Figure 6:
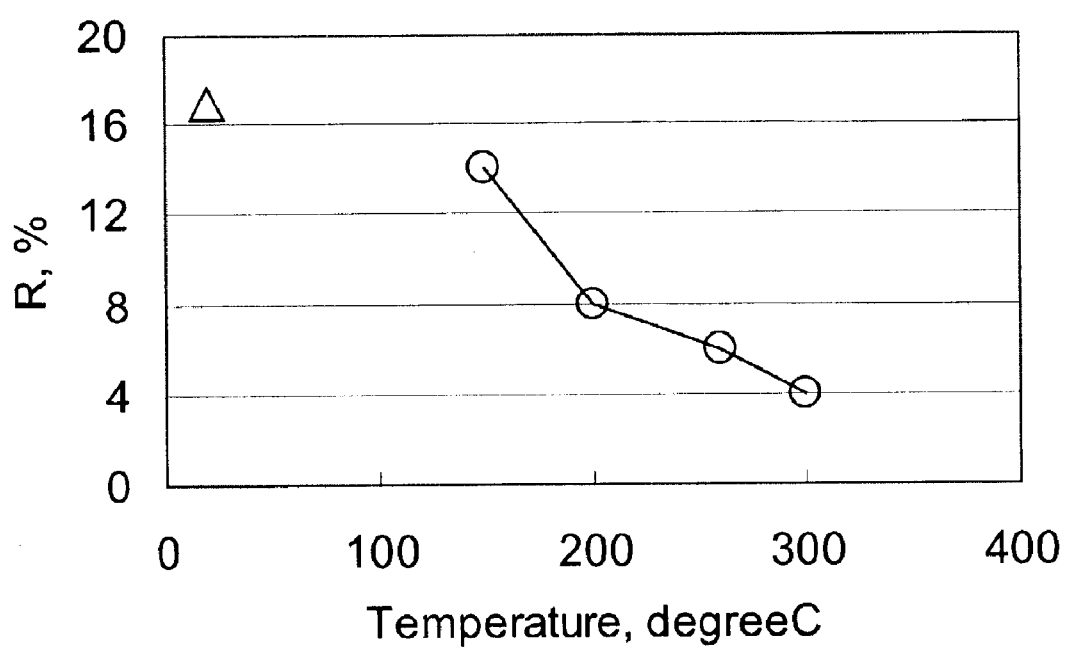
FIG. 6 is a graphical representation showing the result of evaluation of influence of the heat treatment step (Step 6) of the preparation method according to the present invention on rate of bias-dependent variation.

As is evident from FIG. 6, when the heating temperature was raised, the rate of bias-dependent variation reduced.

In this evaluation, the number of times of the repetition of S6 and S8 was reduced to 2 with a view to clarify influence of the heat treatment.

Influence of Repetition of Heat treatment and Re-Chemical Conversion

Figure 8:
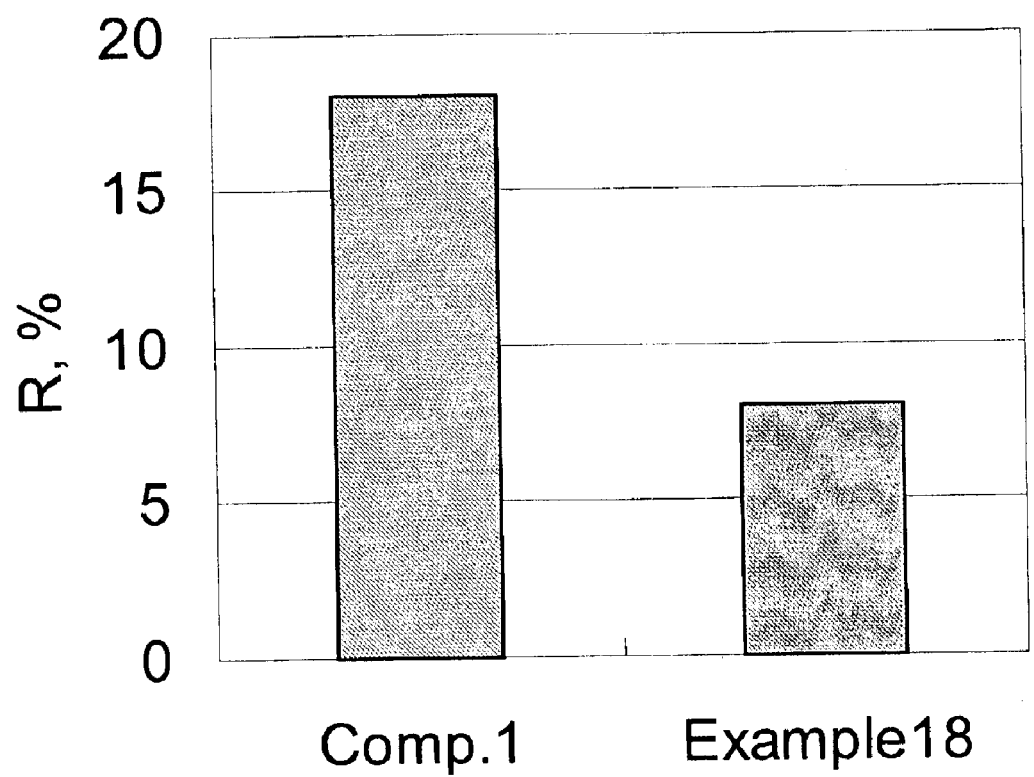
FIG. 8 is a graphical representation showing the result of comparison between the rate of bias-dependent variation of the Nb solid electrolytic capacitor prepared by the second embodiment of the preparation method according to the present invention and that of the Nb solid electrolytic capacitor prepared by the conventional preparation method.

To confirm influence of the repetition of the heat treatment S6 and the re-chemical conversion S8, comparison was made between the rates of bias-dependent variation of the Nb solid electrolytic capacitors obtained by the preparation methods in Example 18 and Comparative Example 1. The results are shown in FIG. 8. By virtue of the addition of the repetition of the heat treatment and the re-chemical conversion, the rate of bias-dependent variation of the Nb solid electrolytic capacitor was considerably improved from 18% to 8%.

Influence of Excess Nitriding

Figure 9:
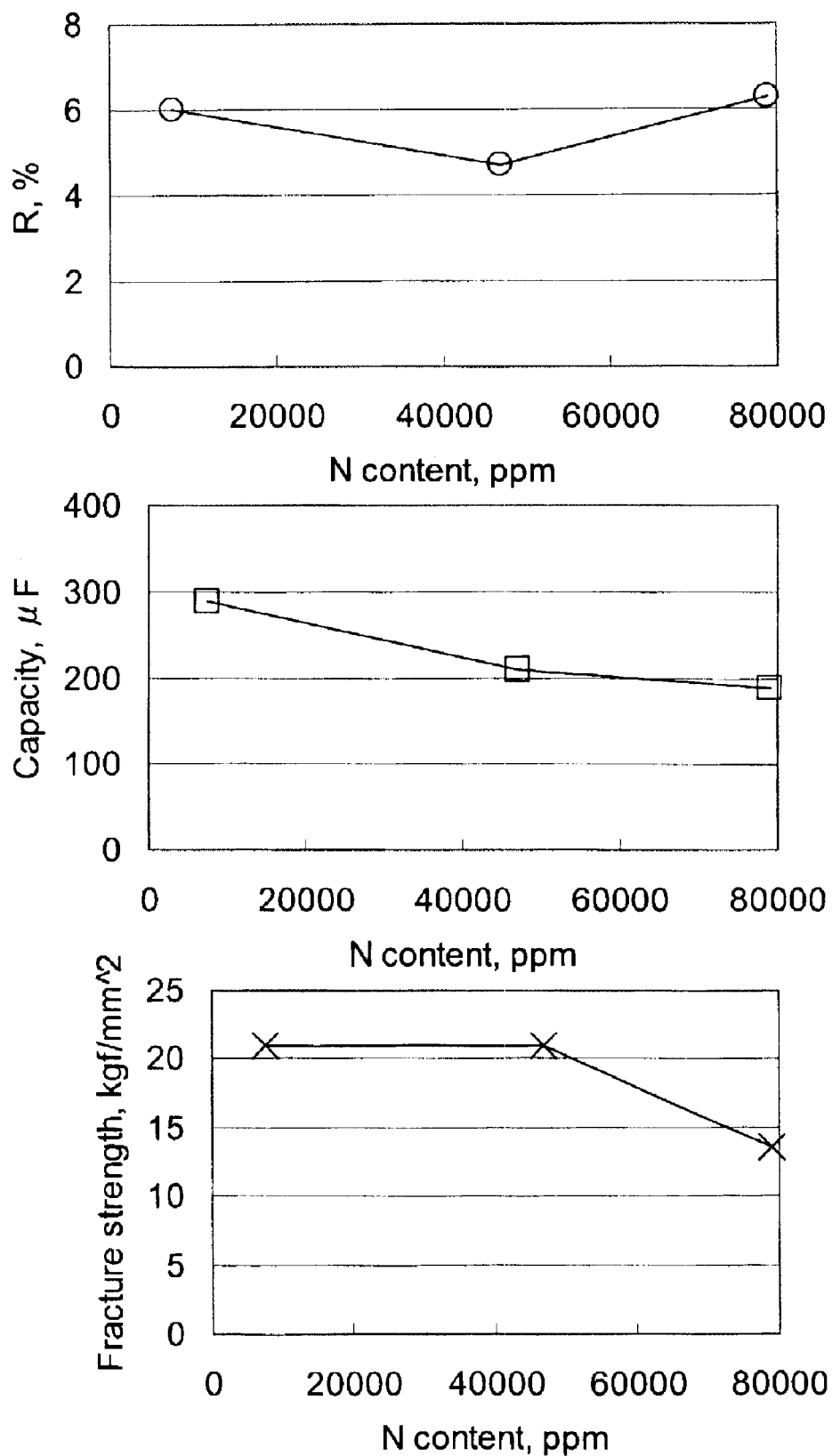
FIG. 9 is a set of three graphical representations showing the results of evaluations of relationships of nitrogen content of the anode body to (1) rate of bias-dependent variation and (2) capacity and (3) breaking fracture strength of the anode body, with respect to the Nb solid electrolytic capacitors prepared in Examples 16 and 19 by the method according to the present invention and in Comparative Example 3.
Figure 10:
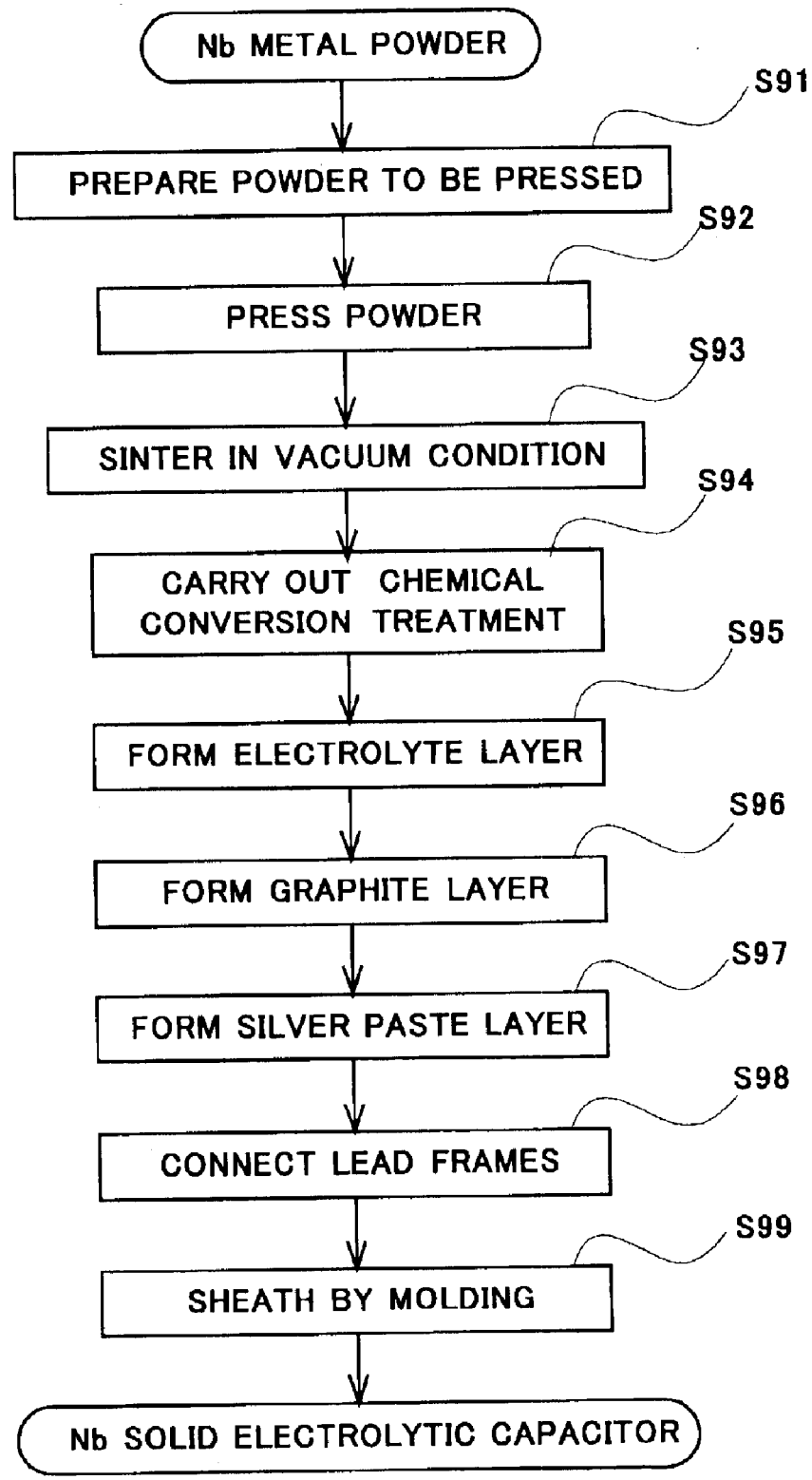
FIG. 10 is a flow chart showing a main part of the method for preparing the conventional Nb solid electrolytic capacitor.

To confirm the upper limit of effective nitrogen content of the anode body, comparison was made among the Nb solid electrolytic capacitors obtained by the preparation methods in Examples 16 and 19 and Comparative Example 3 in rate of bias-dependent variation, capacity of the capacitor and fracture strength of the anode body obtained after the nitriding. The results are shown in FIG. 9.

With respect to the rate of bias-dependent variation, the capacitor with the anode body having a nitrogen content of 7.500 ppm (Example 16) and the capacitor with the anode body having a nitrogen content of 79,000 ppm (Comparative Example 3) had substantial the same bias-dependent variation rate of about 6%. However, the capacitor with the anode body having a nitrogen content of 47,000 ppm (Example 19) showed a bias-dependent variation rate of about 4% which was lower than those of the two others.

With respect to the capacity of the capacitor, the capacitor with the anode body having a nitrogen content of 7,500 ppm (Example 16) had a capacity of 300 $\mu$F. On the other hand, each of the capacitor with the anode body having a nitrogen content of 47,000 ppm (Example 19) and the capacitor with the anode body having a nitrogen content of 79,000 ppm (Comparative Example 3) had a capacity of about 200 $\mu$F which was relatively lower than that of the one other.

With respect to the fracture strength of the anode body obtained after the nitriding, each of the anode body having a nitrogen content of 7,500 ppm (Example 16) and the anode body having a nitrogen content of 47,000 ppm (Example 19) had a fracture strength of higher than 20 kgf/mm$^2$. However, the anode body having a nitrogen content of 79,000 ppm (Comparative Example 3) had a breaking (fracture) strength of lower than 15 kgf/mm$^2$.

What is claimed is:

1. An Nb solid electrolytic capacitor comprising:
   an anode body made from an Nb-based material, said anode body having a nitrogen content of about 7,500 ppm to about 47,000 ppm;
   a dielectric layer formed over the surface of the anode body;
   a solid electrolyte layer formed on the dielectric layer; and
   a cathode body formed on the surface of the solid electrolyte layer.

2. The Nb solid electrolytic capacitor according to claim 1, wherein the anode body has a nitrogen content of about 12,000 ppm to about 22,000 ppm.

3. A method for preparing an Nb solid electrolytic capacitor, said method comprising steps of:
   (A) forming an anode body from an Nb-based material, said anode body having a nitrogen content of about 7,500 ppm to about 47,000 ppm;
   (B) forming a dielectric layer over the surface of the anode body;
   (C) forming a solid electrolyte layer on the dielectric layer; and
   (D) forming a cathode body on the electrolyte layer.

4. The method for preparing an Nb solid electrolytic capacitor according to claim 3, wherein the step (A) includes steps of:
   (A1) sintering an Nb-based powdery material; and
   (A2) externally supplying nitrogen source to the sintered body so as to progress nitriding of the sintered body in the direction from the surface of the sintered body toward the interior of the sintered body to form the anode body.

5. The method for preparing a solid electrolytic capacitor according to claim 4, wherein the Nb-based powdery material is sintered under vacuum in the step (A1), and after the sintering under vacuum, the sintered body is placed in a nitrogen-containing atmosphere without having been exposed to air to nitride the sintered body in the step (A2).

6. The method for preparing an Nb solid electrolytic capacitor according to claim 3, wherein in the step (A), the anode body is so formed as to have a nitrogen content of about 12,000 ppm to about 22,000 ppm.

7. The method for preparing an Nb solid electrolytic capacitor according to claim 3, said method further comprising, between the steps (B) and (C), a step of:
   (E) heating the product resulting from the step (B) at a temperature of about 100° C. to about 300° C.

8. The method for preparing an Nb solid electrolytic capacitor according to claim 7, wherein the dielectric layer is formed by anodic oxidation method in the step (B), said method further comprising, immediately prior to the step (C), a step of:
   (F) re-subjecting the product resulting from the immediately preceding step to anodic oxidation.

9. The method for preparing an Nb solid electrolytic capacitor according to claim 8, wherein the series of the steps (E) and (F) is carried out repeatedly.

10. The method for preparing an Nb solid electrolytic capacitor according to claim 8, wherein the anodic oxidation in the step (F) is carried out at a voltage lower than that in the anodic oxidation in the step (B).

11. The method for preparing an Nb solid electrolytic capacitor according to claim 8, said method further comprising, between the steps (E) and (F), a step of:
    (G) applying an acid-containing aqueous solution to the product resulting from the step (E).

12. The method for preparing an Nb solid electrolytic capacitor according to claim 11, wherein the series of the steps (E) to (F) is carried out repeatedly.

13. A method for preparing an Nb solid electrolytic capacitor, said method comprising steps of:
    (H) forming a dielectric layer by anodic oxidation method over the surface of an anode body made from an Nb-based material;
    (I) heating the anode body provided with the dielectric layer at a temperature of about 100° C. to about 300° C.;
    (J) re-subjecting the product resulting from the step (I) to anodic oxidation;
    (K) forming a solid electrolyte layer on the dielectric layer; and
    (L) forming a cathode body on the solid electrolyte layer.

14. The method for preparing an Nb solid electrolytic capacitor according to claim 13, wherein the series of the steps (I) and (J) is carried out repeatedly.

15. The method for preparing an Nb solid electrolytic capacitor according to claim 13, wherein the anodic oxidation in the step (J) is carried out at a voltage lower than that in the anodic oxidation in the step (H).

16. The method for preparing an Nb solid electrolytic capacitor according to claim 13, said method further comprising, between the steps (I) and (J), a step of:
    (M) applying an acidic chemical cleaning agent (acid-containing aqueous solution) to the product resulting from the step (I).

17. The method for preparing an Nb solid electrolytic capacitor according to claim 16, wherein the series of the steps (I) to (J) is carried out repeatedly.

18. An Nb solid electrolytic capacitor comprising:
    a dielectric layer formed by anodic oxidation method over the surface of the anode body made from an Nb-based material, said anode body provided with the dielectric layer being heated at a temperature of about 100° C. to about 300° C. and then being re-subjected to anodic oxidation;

a solid electrolyte layer formed on the dielectric layer; and a cathode body formed on the solid electrolyte layer.

19. The Nb solid electrolytic capacitor according to claim 18, wherein the anode body with the dielectric layer is repeatedly subjected to the series of the heat treatment and the re-anodic oxidation.

20. The Nb solid electrolytic capacitor according to claim 18, wherein after the heat treatment, the anode body with the dielectric layer is subjected to the re-anodic oxidation carried out at a voltage lower than that in the anodic oxidation.

21. The Nb solid electrolytic capacitor according to claim 18, wherein between the heat treatment and the re-anodic oxidation, an acid-containing aqueous solution is applied to the anode body with the dielectric layer.

22. The Nb solid electrolytic capacitor according to claim 21, wherein the anode with the dielectric layer is repeatedly subjected to the series of the heat treatment to the re-anodic oxidation.

* * * * *